Patented June 7, 1932

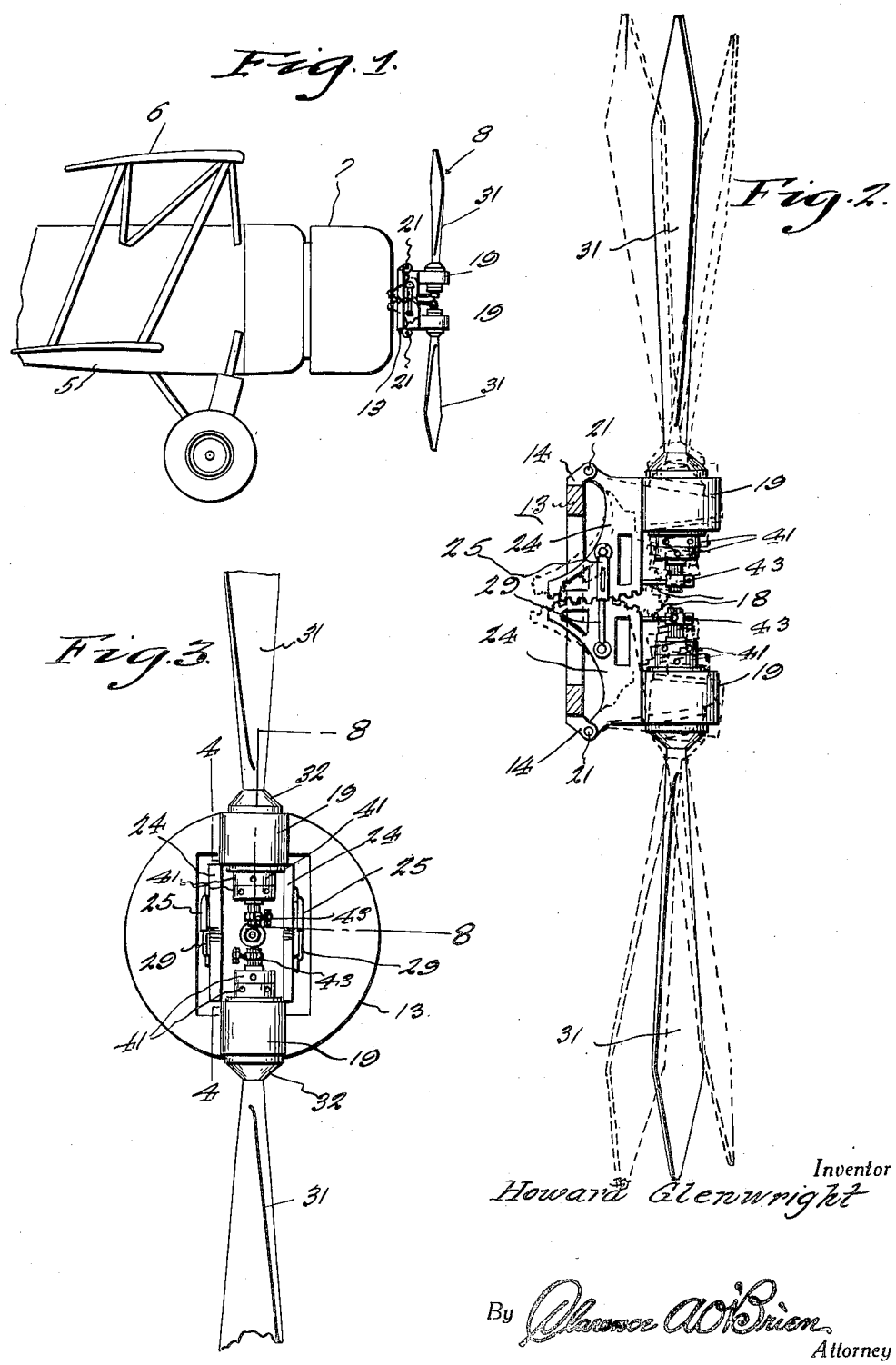

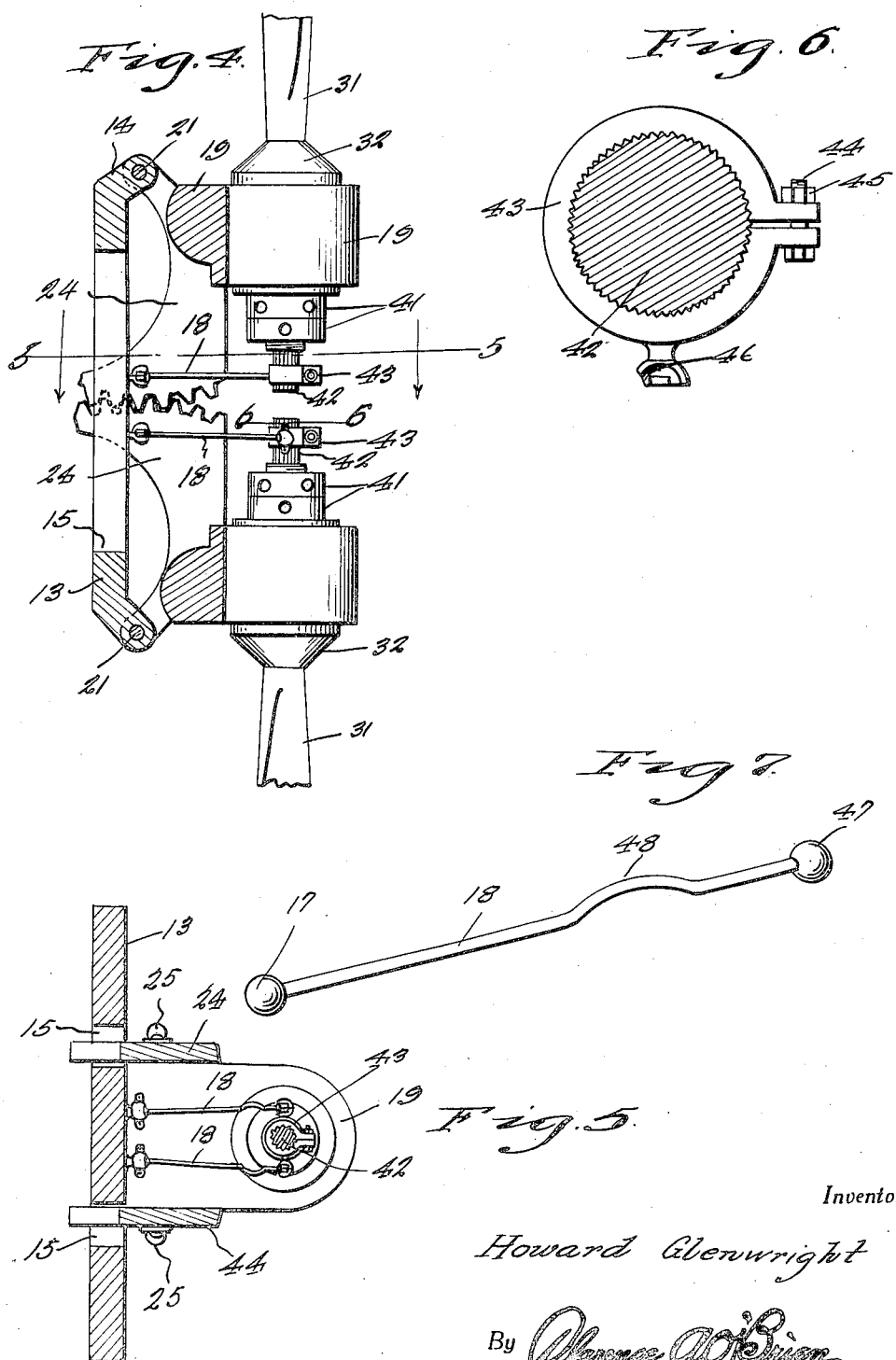

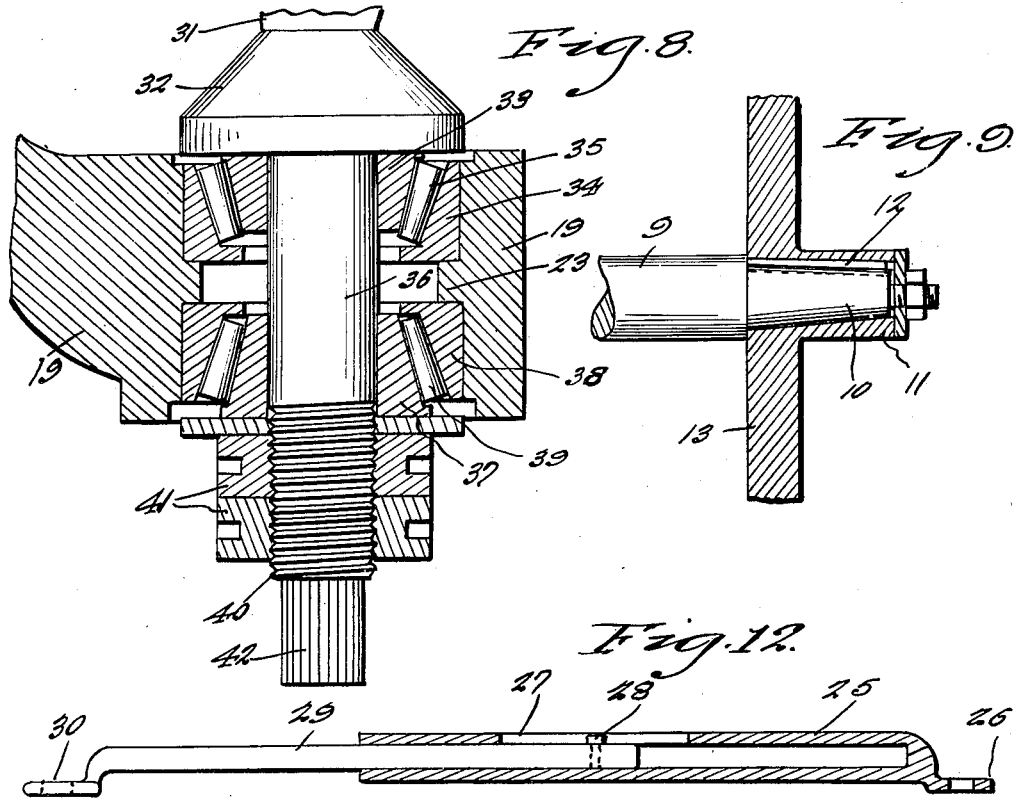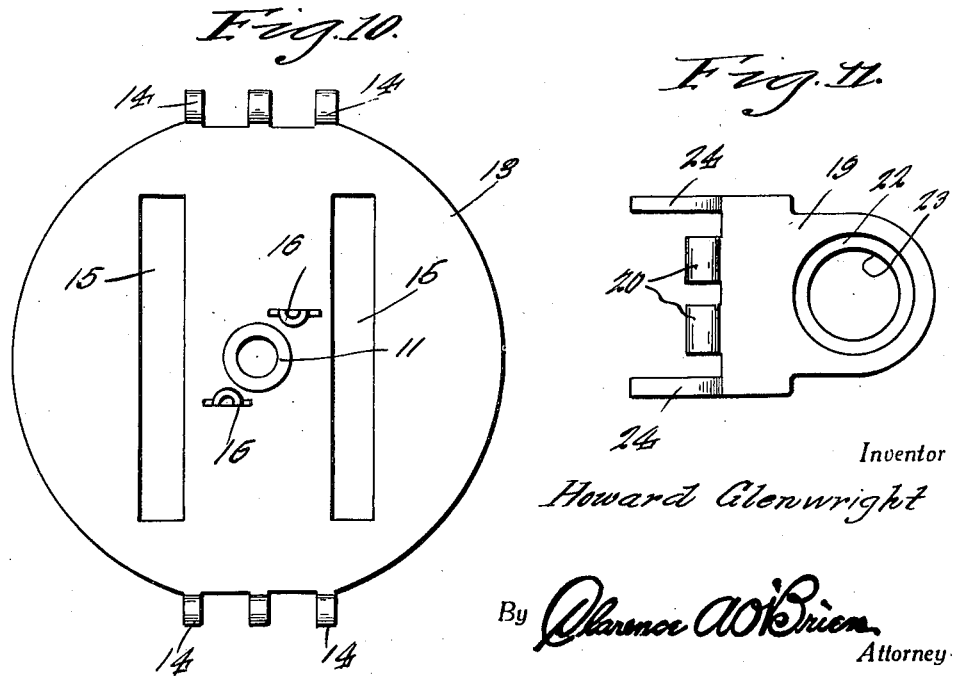

1,862,481

UNITED STATES PATENT OFFICE

HOWARD GLENWRIGHT, OF WILKES-BARRE, PENNSYLVANIA

VARIABLE PITCH PROPELLER

Application filed February 24, 1931. Serial No. 517,957.

This invention appertains to new and useful improvements in variable pitch propellers, and more particularly appertains to a propeller of the pitch adjustable type.

The principal object of this invention is to provide a propeller capable of self-adjusting the pitch of itself by the action of centrifugal force.

Another important object of the invention is to provide a propeller which by the action of centrifugal force is capable of changing its pitch to increase the efficiency thereof as the speed of the aircraft increases.

Still another important object of the invention is to provide a propeller which because of its automatic ability to change its pitch, will bring about the attainment of higher altitudes without plane modification.

Other objects reside in the provision of means for increasing the efficiency of propellers, remedying stalled motors in flight, and permitting a plane to fly at high altitudes with the same efficiency as at sea level without requiring any manual adjustments.

Other important objects and advantages of the invention will become apparent to the reader of the following specification and claims.

In the drawings:—

Figure 1 represents a fragmentary side elevational view of an aircraft equipped with the improved propeller.

Fig. 2 represents a side elevational view of the propeller partly in section.

Fig. 3 represents a fragmentary front elevational view of the propeller.

Fig. 4 represents a sectional view taken substantially on the line 4—4 of Fig. 3.

Fig. 5 represents a sectional view taken substantially on the line 5—5 of Fig. 4.

Fig. 6 represents a sectional view taken substantially on the line 6—6 of Fig. 4.

Fig. 7 represents a perspective view of one of the connecting rods.

Fig. 8 represents a sectional view taken substantially on the line 8—8 of Fig. 3.

Fig. 9 represents a fragmentary detailed view of the connection between the drive shaft and the hub plate.

Fig. 10 represents a front elevational view of the hub plate.

Fig. 11 represents a side elevational view of one of the hinge blocks.

Fig. 12 represents a longitudinal sectional view through the gear connector.

Referring to the drawings wherein like numerals designate like parts, it can be seen in Fig. 1 that numeral 5 represents the fuselage of an aircraft, while numeral 6 represents the wings thereof. Numeral 7 represents the shielded edges in front of which is located the novel propeller generally referred to by numeral 8 and supported by the drive shaft 9, and projecting forwardly from the engine (see Fig. 9).

The forward end of the drive shaft 9 is tapered as at 10 for disposition into the hub structure 11. A suitable key connection 12 is afforded between the portion 10 and the hub, and as can be clearly seen in Figs. 9 and 10, this hub is provided with a circular plate 13 having the hinged knuckles 14 arranged at diametrically opposite points on the periphery thereof.

There are two groups of these knuckles represented in the drawings for accommodating a two-blade propeller, but it is to be understood, that these groups may be increased to accommodate additional blades if desired.

More specifically, the plate 13 has a pair of elongated slots 15—15 therein and at opposite sides of the hub 11. Between the slots 15—15 are located the half sockets 16 which when combined with their complementary removable sections form sockets for receiving the balls 17 on the inner ends of the connecting rods 18 (see Figs. 4 and 7).

Complementary to each group of knuckles 14 is a block 19 which is provided with knuckles 20 for interlapping relation with the knuckles 14. Obviously bolts or pins 21 are disposed thru these knuckles for swingably connecting the block 19 to the plate 13.

As is clearly shown in Figs. 3, 4 and 11, each of these blocks 19 is provided with an opening therethrough denoted by numeral 22 and interrupted by the intermediate circumferentially extending shoulder 23, intermediate the ends of the said opening 22.

Furthermore, each block 19 is provided with a pair of parallel gear segments 24—24 operative thru the slots 15—15 in the plate 13.

As is clearly shown in Fig. 4, the corresponding gears 24 of the complementary blocks 19 mesh with each other so that the action of the blocks 19 in swinging is uniform.

By referring to Figs. 2 and 12, it can be seen that a tube 25 has one end closed and provided with an apertured ear 26. This ear can be secured to one of the gears. The tube 25 is provided with substantially elongated slots 27. Thru this slot extends the pintle 28 from the rod 29 which rod is slidable in the tube 25. One end of this rod 29 is provided with an apertured ear 30 which is to be secured to the complementary gear 24. It is preferable, that one of these motion limiting units be applied to each pair of complementary gears 24.

As each blade unit is of substantially same construction, a description of one will suffice for both. By referring to Fig. 8, it can be seen that numeral 31 represents a propeller blade provided with a collar 32 bearing against the cone 33 of the ball bearing mount which includes the outer cone 34 and the tapering roller bearing 35 which are composed between the cones 33 and 34. The foregoing shows that numeral 36 represents the shank of the blade 31 which extends through the cone 33 and laterally through the opening 22 in the block 19 to project beyond the inner side of the block.

As can be seen in Fig. 8, the outer bearing mount bears against the outer side of the shoulder 23, while a second bearing mount including the cones 37 and 38 with the roller bearing 39 interposed between the same has its cone 39 bearing against the inner side of the shoulder 23. It can be seen, that the cone 38 has the opening in its outer end sufficiently small to prevent the slipping therethrough of the air cone 37, which in the event of the crumbling or disintegration of the roller 39 will prevent the pulling through of the shank 36.

As can be clearly seen in Fig. 8, the inner end of the shank 36 is provided with threads 40 to accommodate the jamb nut 41, while a portion of this end of the shank is reduced and corrugated as at 42. A clamp ring 43 of the split type has its ends secured by the bolt 44 and nut 45 and the inner side thereof is ribbed for co-action with the corrugated surface 42 of the shank so as to prevent any rotation of this ring on the shank.

As is shown in Fig. 4, a protuberance 46 on the ring 43 forms one-half of a socket which is completed by a complementary removable section. In this socket the outer ball 47 on the connecting rod 18 is received. It will be observed in Fig. 7, that the rod 18 is provided with an offset portion 48 to accommodate the inner end of the shank 36 when the blade has been rotated a substantial distance.

As is clearly shown in Figs. 4 and 5, the rod 18 connects to the shank of one blade on one side thereof, while the other rod connects to the shank on the other blade at the opposite side thereof. This is of course to attain the reverse action of the blade to obtain the necessary screw pitch change.

It can now be seen, that at average speed and in an average atmosphere, the propeller blades will assume the solid line position in Fig. 2. However, when the plane reaches a high altitude where the air is thin, the blades should have a greater "bite" and this is obtained by the automatic operation of the propeller. Clearly the pitch of the propeller blade tends to advance the propeller through the air in a more or less screw-like manner and the tendency of the pitch of the blade to swing the blade forwardly acts against centrifugal force, which tends to balance the weight of the blade on opposite sides of a straight line extending through the pivot element 21. Of course, centrifugal force has the same value at all angles and when flying in rarefied air found at high altitudes a diminished resistance is offered to the forward movement of the individual propeller blades 31 about the pivot element 21. Now, at lower levels or altitudes where there is a greater density of air encountered an increase pull is offered to the forward movement of the blade 31 about the pivot element 21 thereof, with the result that air force will prevail and the blades will move forwardly away from the straight line passing through the pivot element 21 thereby causing a decrease of pitch in the propeller blades but still maintaining the same forward action and the same effort of the driving motor.

At high altitudes in light air, centrifugal force prevails and the blades swing rearwardly taking a greater amount of the air to maintain the same forward pull, and at lower altitudes air force prevails and the blades swing forwardly making a smaller amount of dense air but still maintaining the same forward pull.

However, in low altitude, the "bite" should be less and this is accomplished automatically by the action of the blade assisted by the atmospheric conditions and the centrifugal force of the blades.

While the foregoing specification sets forth the invention in specific terms, it is to be understood that numerous changes in the shape, size, and materials may be resorted to without departing from the spirit and scope of the invention as claimed hereinafter.

Having thus described my invention, what I claim as new is:—

1. In a propeller, a hub plate having attaching means, bodies pivoted to said hub plate for pivotal movement in lines approximately at right angles to the axis of the hub plate, blades carried by said bodies, the inner portions of said bodies being provided with gear segments having interlocking engagement, and means limiting the movement of said blades with respect to each other.

2. In a propeller, a hub plate having attaching means, bodies pivoted to said hub plate for pivotal movement in lines approximately at right angles to the axis of the hub plate, blades carried by said bodies, the inner portions of said bodies being provided with gear segments having interlocking engagement and means limiting the movement of said blades with respect to each other, said hub plate being provided with means slidably receiving portions of said gear segments.

3. In a propeller, a hub plate having attaching means, oppositely located bodies pivoted to the outer edge portion of said hub plate and having interlocking gear segments, means connecting said gear segments to limit movement of the same with respect to each other, blades carried by said bodies, means carried by said bodies to limit turning of said blades with respect to said bodies, said gear segments being movable through said plate.

In testimony whereof I affix my signature.

HOWARD GLENWRIGHT.